United States Patent [19]

Gowda et al.

[11] Patent Number: 4,502,700
[45] Date of Patent: Mar. 5, 1985

[54] FERROFLUID LINEAR SEAL APPARATUS

[75] Inventors: Hanumaiah L. Gowda, Nashua; Kuldip Raj, Merrimack, both of N.H.

[73] Assignee: Ferrofluidics Corporation, Nashua, N.H.

[21] Appl. No.: 606,585

[22] Filed: May 3, 1984

[51] Int. Cl.³ .................. F16J 15/40; F16J 15/56
[52] U.S. Cl. .................................. 277/80; 277/135; 277/DIG. 8
[58] Field of Search .............. 277/1, 80, 135, DIG. 7, 277/DIG. 8

[56] References Cited

U.S. PATENT DOCUMENTS

| 3,020,582 | 2/1962 | Roach et al. | 277/80 X |
| 3,620,584 | 11/1971 | Rosenzweig | 277/80 X |
| 4,284,605 | 8/1981 | Pierrat | 277/80 X |

FOREIGN PATENT DOCUMENTS

| 653470 | 3/1979 | U.S.S.R. | 277/80 |
| 661182 | 5/1979 | U.S.S.R. | 277/80 |
| 811027 | 3/1981 | U.S.S.R. | 277/80 |

Primary Examiner—Robert S. Ward
Attorney, Agent, or Firm—Richard P. Crowley

[57] ABSTRACT

A ferrofluid linear seal apparatus to provide a hermetic seal about a shaft engaged in linear motion between a first and second environment, typically between a vacuum atmosphere and atmospheric pressure, which seal apparatus comprises: a housing for a shaft element; a nonmagnetically permeable shaft element adapted for linear motion within the housing; an annular permanent magnet about the shaft element; an annular magnetically-permeable pole piece about the shaft element, the outer diameter of the pole piece extending into a close, noncontacting relationship with the inner diameter of the housing to form a plurality of separate spaced-apart radial gaps; ferrofluid retained in the radial gaps by the magnetic flux of the permanent magnet; and linear bearings to provide support for the linear movement of the shaft element within the housing.

19 Claims, 3 Drawing Figures

4,502,700

FERROFLUID LINEAR SEAL APPARATUS

BACKGROUND OF THE INVENTION

A linear seal apparatus is a device which provides hermetic sealing about a surface of a shaft, yet permits the shaft to transmit power by linear motion of the shaft. Of course, power transmission of a shaft can be by either linear or rotary motion of the shaft or by a combination of both. In a conventional ferrofluid rotary seal shaft apparatus, sealing of the shaft takes place in one or more of the radial gaps formed between the outside diameter of the shaft element and the inside diameter of the pole pieces. Such ferrofluid rotary seal shaft apparatus are not satisfactory where the shaft must perform linear motion, since the ferrofluid gets displaced along the shaft during linear motion of the shaft resulting in the ultimate failure of the seal. An additional disadvantage of a standard ferrofluid rotary shaft seal apparatus used for linear motion is that the ferrofluid on the shaft surface often is displaced into the environment to be protected, such as an inert environment or a subatmospheric environment, such as a vacuum chamber, causing contamination.

Linear seal apparatuses are usefully employed in a number of industrial processes and are particularly useful; for example, in the processing equipment and systems that produce semiconductor chips or wafers in controlled inert or vacuum environments and in similar applications wherein a linear seal apparatus must provide for low- or high-pressure hermetic sealing between a first and second environment, typically at different pressures, and yet provide for excellent power transmission during the linear and often linear and rotary motion of the shaft element.

Therefore, it is desirable to provide a linear seal apparatus which provides for low- and high-pressure hermetic sealing and for excellent power transmission during linear motion or even linear and/or rotary motion of the shaft, and yet overcomes the disadvantages associated with prior-art seal apparatuses.

SUMMARY OF THE INVENTION

The invention relates to a linear seal apparatus and to a system employing the linear seal apparatus. In particular, the invention concerns a ferrofluid linear seal apparatus and a system for the production of semiconductive chips in which the ferrofluid linear seal apparatus is employed.

The invention comprises a ferrofluid linear seal apparatus, which seal apparatus provides for a low- or high-pressure hermetic seal about the surface of the shaft, the shaft adapted to engage in linear motion and the linear seal apparatus adapted to provide a seal for the shaft between a first and second environment. The ferrofluid linear seal apparatus of the invention provides for a ferrofluid sealing to take place in one or a plurality of radial gaps to form a single- or multiple-stage ferrofluid seal with the radial gap or gaps formed between the inside diameter of a housing for the shaft element and the outside diameter of the pole pieces employed in the ferrofluid linear seal apparatus.

The ferrofluid linear seal apparatus of the invention provides particular application where linear motion or linear and rotary motion of the shaft element is desirable between a first environment at a subatmospheric pressure and a second environment at an atmospheric or super-atmospheric pressure, or between an environment of different chemical natures; such as, between an atmospheric environment and an inert environment. More generally, the linear seal apparatus of the invention is usefully employed in processing equipment for the aid in the production of semiconductive chips or wafers wherein the manufacture of the semiconductive chips or wafers is carried out in a controlled inert or vacuum chamber and wherein the linear motion of the shaft element extends from a housing into the controlled environment or vacuum chamber so as to provide for movement of the semiconductive chips or wafers in the manufacturing process within the controlled or vacuum chamber.

The ferrofluid linear seal apparatus comprises a magnetically-permeable housing for the shaft element, the housing having an inner diameter and an inner surface and generally one end of the housing adapted to be secured to a support and generally employing a non-magnetically permeable shaft element in the housing extending from the one to the other end of the housing and in which the shaft element at the one end extends into a protected or controlled environment; such as, a vacuum chamber, and the other end extends from the other end of the housing so that linear and/or rotary and linear motion may be imparted to the shaft element so as to displace linear or rotary, or both, shaft elements within the housing. Bearing means are used to provide for support for the linear and/or linear or rotary motion of the shaft element within the housing; such as, for example, linear or plastic bearing means which may comprise the combination of linear rotary bearing means or separate linear and rotary bearing means. A linear driving means is generally employed at one end of the shaft; such as, a linear driving motor to drive the shaft in a reciprocal linear motion while within the housing.

The ferrofluid linear seal apparatus also includes an annular permanent magnet about the shaft element and disposed within the housing, the annular permanent magnet may comprise in one embodiment a radially-polarized permanent magnet and in another embodiment an axially polarized permanent magnet. Where an axially-polarized permanent magnet is employed the ferrofluid seal provides for a magnetic-flux circuit which is completed through the magnetically-permeable housing and pole pieces made of magnetically-permeable material adjacent and typically in a magnetic-flux relationship with the axially-polarized magnet and the ferrofluid in the radial gap or gaps between the one or both pole pieces in the housing. Typically, where an axially polarized permanent magnet is employed, pole pieces are empolyed on either side of the permanent magnet and generally adjacent the magnet, and the outer diameter of the pole pieces extend into a close, noncontacting relationship with the inside diameter or inside surface of the housing to form one or a plurality of radial gaps depending upon whether a single stage or a multiple ferrofluid O-ring seal is to be formed. A single-stage seal may be employed where the linear motion is slow and the pressure capacity of the seal is low, and more typically a multiple-stage multiple ferrofluid O-ring seal is desirable. Due to the high concentration of the magnetic flux in the radial gap between the first and second pole pieces and the external housing wherein multiple stages are formed, the multiple ferrofluid O-ring seals formed provide for hermetic sealing both in a rotary and linear motion of the shaft.

In another embodiment a ferrofluid linear seal apparatus may comprise a radially-polarized permanent magnet wherein one or more radial gaps; that is, one or more stages are formed on the external diameter of the radially-polarized magnet, and the permanent magnet is employed together with an annular nonmagnetic spacing element and with an annular pole piece which also typically contains one or a plurality of radial gaps about the outer diameter. In this embodiment, the magnetic flux circuit is through the magnetically-permeable housing, the magnetically-permeable sleeve or keeper element about the shaft element and a radially polarized magnet and the ferrofluid in the radial gaps between the magnet and the housing and between the pole piece and the housing. As before, due to the high concentration in the radial gaps and particularly where multiple radial gaps are employed, multiple ferrofluid O-ring seals will be formed in the radial gaps between the inside diameter of the housing and the outside diameter of the pole piece and the outside diameter of the radially-polarized magnet which acts in this case as a pole piece so as to provide a hermetic sealing both in rotary and linear motion of the shaft. In this embodiment, the radially-polarized permanent magnets and the pole piece are separated by a nonmagnetic spacing element disposed on the magnetically-permeable keeper or sleeve about the nonmagnetically-permeable shaft. Static seals in both embodiments are provided between the shaft elements and the pole pieces in the first embodiment and the keeper in the second embodiment.

As described, the pressure capacity of the linear ferrofluid seal apparatus in both embodiments is a function of the magnetic flux density in the radial gap, the number of stages and the magnetic saturation capacity of the ferrofluid. Since a multiple-stage ferrofluid linear seal apparatus provides for both linear and rotary motion of the seal apparatus, such embodiments are preferred; however, it is recognized that single-stage seal apparatuses may be employed where there is slow linear motion and there is no low-pressure design requirements for the seal apparatus. The linear seal apparatus of the invention permits the employment of nonmagnetically-permeable linear and rotary bearings such as bronze bearings or bearings composed of a nonmagnetic material, such as plastic linear bearings, since the bearings are not involved in the magnetic flux path of the linear seal apparatus.

The composition of the permanent magnet material may vary, if desired, and may be composed of a plastic or polymeric material composed of a metallic, magnetic-type material. As desired, the ferrofluid employed typically should comprise both a ferrolubricant, that is, exhibit lubricant properties to provide for lubrication during the rotary or linear motion of the shaft, and yet provide for sealant properties. Generally, the ferrofluid will contain a nonvolatile carrier liquid, such as a hydrocarbon or a diester having lubricant properties, and would have a viscosity at 25° C. or from about 100 to about 1000 cps; for example, 200 to 1000 cps, to reduce the friction and have a magnetic saturation of about 200 to 800 gauss; such as, for example, from about 350 to 500 gauss.

Optionally, the ferrofluid linear seal apparatus may include various techniques and means to store and retain the ferrofluid within the housing; for example, in order to prevent loss of the ferrofluid initially in wetting the inner surface of the housing on assembly and installation a sufficient amount of a ferrofluid is smeared in the housing bore during the assembly process. The ferrofluid is retained in the housing; for example, by employing a slightly magnetized housing, to help retain the ferrofluid in position and to prevent its removal from the housing during the linear motion. In addition, a series of small, spaced-apart grooves are formed within the inside surface of the housing or separate grooves which may be full or partially peripheral grooves and which grooves retain the ferrofluid in the grooves due to the surface tension of the ferrofluid within the small grooves. Thus, the diameter of the grooves should be so selected to retain the ferrofluid by surface tension. Such grooves permit the ferrofluid to be retained to the sealing areas under magnetic force and to prevent the ferrofluid from being forced from the housing during linear motion of the shaft.

In addition and optionally, an annular collecting magnet may be disposed in one or both ends of the housing to serve as a means for magnetically collecting ferrofluid which is forced toward the one or the other end of the housing during the linear motion of the shaft so that displaced ferrofluid from the operation of the seal apparatus is collected during motion of the shaft in one direction due to the hermetic seal formed and drawn to the collecting area due to the strong magnetic field in the other direction. The collecting magnetic field area will retain the ferrofluid while the stronger magnetic field of the permanent magnet will withdraw the collected ferrofluid into the sealing area. Ferrofluid may be retained and stored for use by making the inside diameter of the housing porous and saturating the porous housing with the ferrofluid so that the ferrofluid is absorbed in the porous nature of the housing and drawn out as required as the ferrofluid is evaporated or displaced during linear seal apparatus operation. Further, a porous material containing ferrofluid may be disposed between the pole pieces of the axially polarized permanent magnet so as to serve as a ferrofluid storage reservoir.

In order to reduce contamination of the bearing lubricant at each end of the housing with the ferrofluid employed within the housing, rod wipers may be employed at each end of the housing adjacent to the bearings at each end of the housing so as to prevent the linear movement of the ferrofluid into contact with the bearing grease or lubricant. Such rod wipers may comprise thin, typically a knife-like annular blade element extending about and in contact with the surface of the shaft element adjacent the bearing means so as to collect and prevent the further outward linear movement of the ferrofluid. One or a plurality of spaced-apart rod wipers may be employed at one or both ends in order to prevent a mixing of the bearing lubricants with the ferrofluid or ferrolubricant employed in the seal apparatus and are particularly necessary where such bearing lubricant and ferrofluid may be incompatible.

The linear seal apparatus of the invention will be described for purposes of illustration only in connection with certain preferred embodiments employing an axial and radially-polarized permanent magnets; however, it is recognized that various changes, modifications and improvements may be made to the illustrated embodiments all of which fall within the spirit and scope of the invention.

DESCRIPTION OF THE EMBODIMENTS

Figure 1:
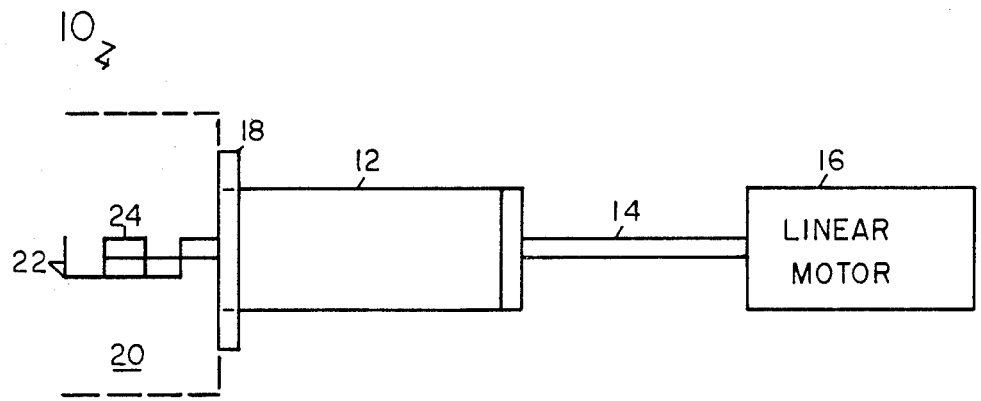
FIG. 1 is a schematic illustration of the linear seal apparatus of the invention employed in a semiconducting manufacturing system.

FIG. 1 illustrates a semiconductive wafer or chip system 10 wherein a ferrofluid linear seal apparatus 12 of the invention is employed which contains a shaft 14 which is moved in lineal reciprocating motion by a linear motor 16. The linear seal apparatus 12 is secured to a vacuum chamber 20 in which the semiconductor processing occurs through a flange 18 on the seal apparatus and the other end of the shaft 14 is secured to a tray or platform 22 which contains one or more silicon or silicon-type semiconductive wafers or chips 24 which must be linearly displaced within the vacuum chamber 20 during the manufacturing process.

Figure 2:
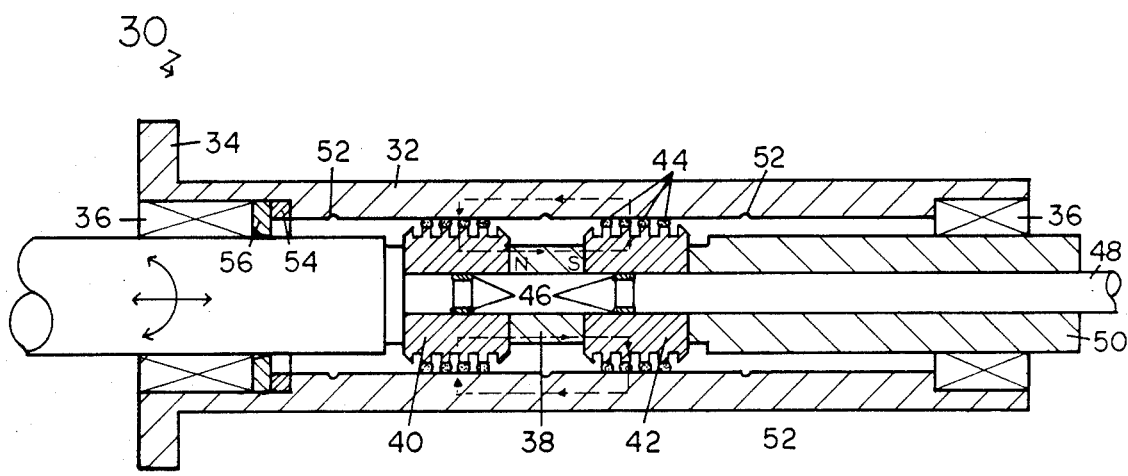
FIG. 2 is a schematic sectional view of one embodiment of a ferrofluid linear seal apparatus of the invention.

FIG. 2 is a schematic sectional view of a ferrofluid linear seal apparatus of the invention wherein an axially-polarized permanent magnet is employed. The ferrofluid linear seal apparatus 30 comprises a magnetically-permeable housing having a flange 34 at one end to be secured to a wall of a chamber which serves as a vacuum chamber (not shown) and the housing containing therein a shaft 48 which extends from the one to the other end of the housing, the one end of the shaft adapted to be secured to a motor means (not shown) for a typical linear motion and/or linear and rotary motion or the other end of the shaft extends into the vacuum chamber. The shaft 48 is supported by plastic or combination (rotary and linear) antifriction ball bushing linear bearings 36 at each end of the housing 32 and the shaft 40 contains thereon an axially-polarized annular permanent magnet 38, and secured to the shaft 48. Adjacent the permanent magnet 38 first and second magnetically-permeable pole pieces 40 and 42 the outer surface of each pole piece having a series of ridges and knife edges which extend into a close noncontacting relationship with the inside surface of the housing to form a plurality of radial gaps and ferrofluid 44 in the radial gaps to form a plurality of separately spaced-apart O-ring ferrofluid seals. The shaft 48 is nonmagnetic and contains a nonmagnetic sleeve 50 about the shaft while the pole pieces 40 and 42 are secured to the shaft through static seals 46.

The inside of the housing 32 is characterized by a plurality of separate peripheral small grooves 52 for the storage and retention of ferrofluid therein during the operation of the linear seal apparatus. Adjacent the plastic or ball bushing linear bearings 36 toward the vacuum chamber end of the seal apparatus 30 is disposed an annular collector magnet 54 to collect ferrofluid displaced toward the vacuum chamber by the linear motion of the shaft 48 and a peripheral annular Teflon ® bladed rod wiper 56 adjacent the collected magnet to contain ferrofluid and prevent the ferrofluid from moving linearly into contact with the lubricant employed in the linear bearing 36.

As illustrated in this embodiment with the use of axially-polarized magnet 38 the magnetic flux circuit is completed through the magnetically-permeable housing 32; the adjacent pole pieces 40 and 42 made of magnetically-permeable material, the axially polarized magnet 38, and the ferrofluid 44 in the radial gaps of the multiple stages between the outside diameter of the pole pieces and the inside diameter of the housing 32. The magnetic flux path is shown in the drawing in dotted lines due to the high concentration of magnetic flux in the radial gaps between the pole pieces and the multiple stages. Multiple ferrofluid O-rings are formed to provide for hermetic sealing both in rotary and linear motion of the shaft 48. O-rings 46 represents static seals between the pole pieces 40 and 42 and the shaft 48 while the nonmagnetic sleeve 50 is press fitted onto the shaft 48.

Figure 3:
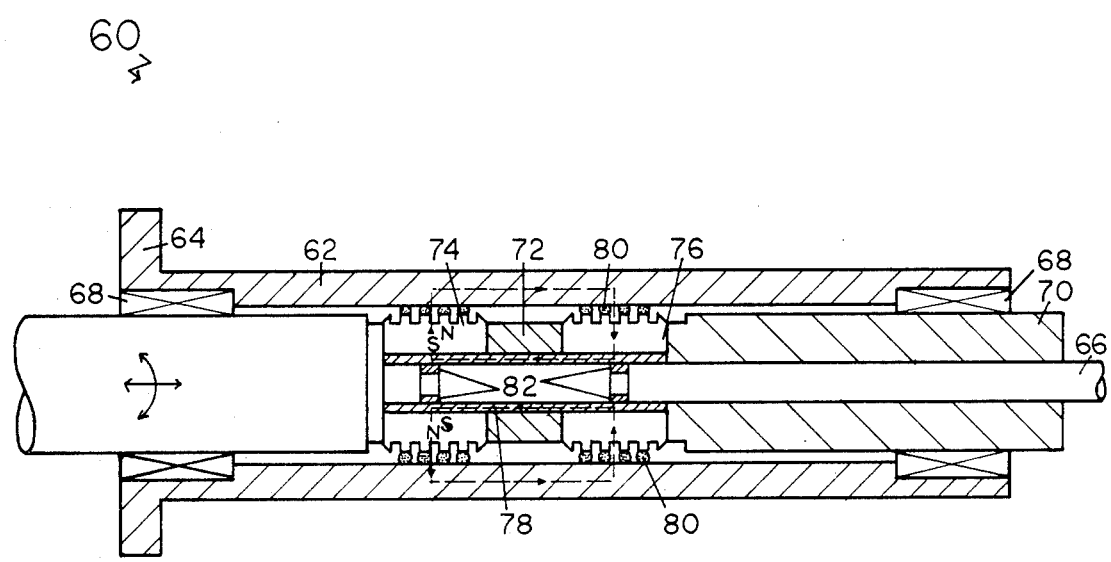
FIG. 3 is a schematic sectional view of another embodiment of a ferrofluid linear seal apparatus of the invention.

FIG. 3 is directed to an embodiment which employs a radially-polarized permanent magnet and wherein the ferrofluid linear seal apparatus 60 includes a housing 62 having a flange 64 at one end for securing the housing to a wall of a vacuum chamber (not shown) to the left of the flange, and which housing 62 includes therein a nonmagnetically-permeable shaft element 66 having a nonmagnetically-permeable sleeve element 70 thereabout. The shaft at the one end and the shaft and sleeve at the other end are supported by linear bearings 68 which in the embodiment shown comprise linear/rotary bearings to permit the linear and rotary motion of the shaft 66. The seal apparatus 60 includes an annular radially-polarized permanent magnet 74 formed, for example, of a polymeric material which is an elastomeric material which is of high magnetic flux capable of being molded so as to provide for a plurality of stages at the outer diameter of the magnet which extend into a close, noncontacting relationship with the inner diameter and inner surface of the housing 62 to form a plurality of radial gaps. The magnetically-permeable pole piece 76 is employed and spaced apart from the radially-polarized permanent magnet by a nonmagnetic spacer of 72 such as of aluminium or bronze. Like the radially polarized permanent magnet the pole piece 76 provides for a plurality of radial gaps about the outside surface of the pole piece. The radially-polarized permanent magnet 74, the spacer of 72, and the magnetically-permeable pole piece 76 are placed on a magnetically-permeable keeper 78 about the shaft 66; the keeper is sealed through O-ring static seals 82 to the shaft element 66.

The plurality of radial gaps permits the formation of a plurality of separate, spaced-apart, multiple-stage ferrofluid seals with ferrofluid 80 in the radial gap to form separate O-ring seals. The magnetic flux circuit of the seal of FIG. 3 is illustrated in dotted lines and is through the housing 62, the pole piece 76, the keeper 78, the magnet 74, and the ferrofluid in the multiple ferrofluid O-ring seals in the radial gap. The ferrofluid seal embodiment as illustrated in FIG. 3 permits the rotary and lineal motion of the shaft 66 within a vacuum chamber (not shown). Optionally, the linear seal apparatus of FIG. 3 may also include peripheral grooves, magnetic collection means at the one end and rod wiper means for the storage and retention of the ferrofluid within the housing.

The ferrofluid linear seal apparatus provides for significant advantages over prior linear seals and forms an effective single or, preferably, multiple-stage ferrofluid seal in the radial gap falling between the inside of the housing and the outside diameter of the pole pieces where an axial permanent magnet is employed and the outside diameter of the radially polarized magnet and a pole piece where a radially polarized magnet is employed. Thus, the ferrofluid seal apparatus provides for hermetic sealing for power transmission of the shaft in both rotary and linear motions, no wear on the sealing elements, a low drag torque, and long seal life.

What is claimed is:

1. A ferrofluid linear seal apparatus to provide a hermetic seal about a shaft engaged in linear motion between a first and second environment, which seal apparatus comprises:
   (a) a magnetically-permeable housing having a one end and another end and having an inner diameter and an inner surface;
   (b) a nonmagnetically permeable shaft element extending within the housing and extending from the one to the other end of the housing;
   (c) an annular permanent magnet about the shaft element in the housing;
   (d) an annular, first, magnetically-permeable pole piece about the shaft element in the housing, the pole piece having an outer diameter and an outer surface which extends into a close, noncontacting, spaced-apart relationship with the inner diameter and inner surface of the housing to define one or a plurality of small radial gaps between the inner surface of the housing and the outer surface of the first pole piece;
   (e) ferrofluid retained in the radial gap or gaps by the magnetic flux of the permanent magnet to form one or a plurality of separate, spaced-apart, ferrofluid O-ring seals between the inner surface of the housing and the outer surface of the pole piece; and
   (f) bearing means to provide support for the linear movement of the shaft element in the housing;
thereby providing a ferrofluid linear seal apparatus with hermetic sealing by ferrofluid O-ring seals in the radial gap during linear motion of the shaft element within the housing.

2. The seal apparatus of claim 1, which seal apparatus includes an axially-polarized permanent magnet and includes a second pole piece, the first and second pole pieces in an adjacent, magnetic-flux relationship with the intervening axially-polarized annular permanent magnet, the second pole piece having an outer diameter which extends into a close, noncontacting, spaced-apart relationship with the inner diameter and inner surface of the housing to form one or a plurality of radial gaps therebetween and which includes a ferrofluid in the radial gaps of the second housing to form a one or a plurality of ferrofluid O-ring seals by the magnetic flux of the permanent magnet, the magnetic flux circuit of the sealed apparatus passing through the first pole piece, the axially-polarized permanent magnet, the second pole piece and the ferrofluid in the radial gaps in the housing.

3. The seal apparatus of claim 1 wherein the permanent magnet comprises a radially-polarized permanent magnet having an outer diameter which extends into a close, noncontacting relationship with the surface of the inner diameter and inner surface of the housing to form a one or a plurality of radial gaps and which includes ferrofluid in the radial gaps which therefore provides one or a plurality of spaced-apart ferrofluid O-ring seals and which includes a nonmagnetic spacer element positioned between the radially-polarized permanent magnet and the first pole piece and which includes a magnetically-permeable cylindrical keeper element about the shaft so as to provide for a magnetic flux circuit in the seal apparatus extending from the radially-polarized permanent magnet, the ferrofluid in the radial gaps, the housing, the ferrofluid in the radial gaps of the pole pieces, the first pole piece and the keeper element.

4. The seal apparatus of claim 1 wherein the ferrofluid has a viscosity ranging from about 100 to 1000 cps at 25° C.

5. The seal apparatus of claim 1 wherein the ferrofluid has a magnetic saturization of from about 200 to 800 gauss.

6. A manufacturing system which comprises:
   (a) the seal apparatus of claim 1;
   (b) a linear motor means to provide for the linear displacement of the shaft element of the seal apparatus; and
   (c) a vacuum chamber means, the seal apparatus secured to the vacuum chamber means and one end of the shaft element extending into the vacuum chamber;
whereby the linear motor means secured to the other end of the shaft element provides for linear motion of the shaft element at the one end in the vacuum chamber means in a hermetically-sealing manner.

7. The system of claim 6 which includes:
   (a) means to move a semiconductive wafer or chip within the vacuum chamber means; and
   (b) means to secure the shaft element to the moving means.

8. The seal apparatus of claim 1 wherein the housing is characterized by a plurality of small diameter, spaced-apart peripheral grooves on the inner surface of the housing to retain ferrofluid within the grooves during operation of the ferrofluid linear seal apparatus.

9. The seal apparatus of claim 1 which includes at the one or the other end of the seal apparatus a collector permanent magnet means to collect and retain ferrofluid displaced during the linear motion of the shaft element, the permanent magnet collecting means disposed adjacent and toward the hermetically-sealed environment.

10. The seal apparatus of claim 9 which includes a rod wiper means to position the downstream of the permanent magnet collecting means to provide a wiping action against the external surface of the shaft to prevent the movement of the ferrofluid into contact with any lubricant in the linear bearing means through linear motion of the shaft element.

11. The seal apparatus of claim 1 which includes ferrofluid storage means to retain ferrofluid within the housing during linear motion of the shaft element in operation.

12. A ferrofluid linear seal apparatus to provide a hermetic seal about a shaft engaged in linear motion between a first and second environment and which seal apparatus comprises:
   (a) a magnetically-permeable housing for the shaft element, the housing having a one end and another end and an inner diameter and an inner surface;
   (b) a nonmagnetically permeable shaft element within the housing extending from the one to the other end of the housing;
   (c) an axially polarized annular permanent magnet means about the shaft element in the housing;
   (d) a first and a second annular magnetically-permeable pole piece element about the shaft element in the housing, the annular permanent magnet between the first and second pole piece in a close, adjacent, magnetic-flux relationship, the outer surface of the first and second pole piece extending into a close, noncontacting relationship with the inner surface of the housing to provide for a plurality of separate, spaced-apart radial gaps between the inner surface of the housing and the outer surface of the first or second pole pieces; and (e) ferrofluid retained in the radial gaps so as to form a plurality of separate, spaced-apart, ferrofluid O-rings between the inner surface of the housing and the outer surface of the first and second pole pieces to provide a pressure capacity to the seal apparatus, the ferrofluid retained within the magnetic gaps by the magnetic flux of the annular permanent magnet and linear bearing means to provide support for the linear movement of the shaft element in the housing, the magnetic flux circuit of the seal apparatus passing between the axially-polarized permanent magnet, the first and second pole pieces, the ferrofluid in the radial gaps and the housing.

13. The seal apparatus of claim 12 which includes ferrofluid peripheral storage grooves in the inner surface of the housing to provide for the retention or storage of ferrofluid during operation of the seal apparatus.

14. The seal apparatus of claim 12 which includes a collector magnet disposed at and toward the first or second environment in which a hermetic seal is desired, the collector magnet means designed to collect and store ferrofluid displaced by the linear motion of the shaft.

15. A system for the manufacture of semiconductive wafers or chips, which system comprises:
(a) the seal apparatus of claim 12;
(b) a vacuum chamber means in which the manufacture of semiconductive wafers or chips is carried out, the seal apparatus secured thereto in one end of the shaft element extending into the vacuum chamber means; and
(c) a linear motor means secured to the other end of the shaft element to provide for linear motion of the shaft element at the other end within the vacuum chamber and semiconductive processing chips or wafers on a transport means secured to the other end of the shaft to provide for linear movement of the transport means with the semiconductive wafers within the vacuum chamber.

16. A ferrofluid linear seal apparatus to provide a hermetic seal about a shaft engaged in linear motion between a first and second environment, which seal apparatus comprises:
(a) a magnetically-permeable housing for a shaft element, the housing having a one and another end and an inner diameter and an inner surface;
(b) a nonmagnetically-permeable shaft element within the housing extending from the one to the other end of the housing;
(c) a radially-polarized annular permanent magnet about the shaft element in the housing;
(d) a first, magnetically-permeable pole piece about the shaft element in the housing;
(e) a nonmagnetic spacer element between the radially-polarized permanent magnet and the first pole piece and about the shaft element;
(f) the outer diameter of the radially polarized permanent magnet and the outer diameter of the first pole piece extending into a close, noncontacting relationship with the inner diameter and inner surface of the housing to form a plurality of separate, spaced-apart radial gaps between the outer diameter of the radially-polarized permanent magnet and the outer diameter of the first pole piece;
(g) a magnetically-permeable keeper element secured to the nonmagnetically-permeable shaft and extending beneath the radially-polarized magnet and the first pole piece; and
(h) ferrofluid retained in the radial gaps by the magnetic flux of the radially-polarized permanent magnet to form a plurality of separate, spaced-apart, ferrofluid O-ring seals between the outer diameter of the first pole piece and the permanent magnet and the inner surface of the housing, the magnetic flux circuit of the seal apparatus passing from the radially-polarized permanent magnet, the ferrofluid in the radial gaps, the magnetically-permeable housing, the ferrofluid in the radial gaps, the first pole piece and the magnetically-permeable keeper element.

17. The seal apparatus of claim 16 which includes ferrofluid peripheral storage grooves in the inner surface of the housing to provide for the retention or storage of ferrofluid during operation of the seal apparatus.

18. The seal apparatus of claim 16 which includes a collector magnet means disposed at and toward the first or second environment in which a hermetic seal is desired, the collector magnet means designed to collect and store ferrofluid displaced by the linear motion of the shaft.

19. A system for the manufacture of semiconductive wafers or chips, which system comprises:
(a) the seal apparatus of claim 16;
(b) a vacuum chamber means in which the manufacture of semiconductive wafers or chips is carried out, the seal apparatus secured thereto in one end of the shaft element extending into the vacuum chamber means; and
(c) a linear motor means secured to the other end of the shaft element to provide for linear motion of the shaft element at the other end within the vacuum chamber and semiconductive processing chips or wafers on a transport means secured to the other end of the shaft to provide for linear movement of the transport means with the semiconductive wafers within the vacuum chamber.

* * * * *